United States Patent Office 3,846,112
Patented Nov. 5, 1974

---

3,846,112
PLANT GROWTH REGULATORS
Llewellyn W. Fancher, Orinda, Calif., assignor to Stauffer Chemical Company, New York, N.Y.
No Drawing. Original application Apr. 2, 1970, Ser. No. 25,296, now Patent No. 3,701,799. Divided and this application May 15, 1972, Ser. No. 253,092
Int. Cl. A01n 9/20
U.S. Cl. 71—76      7 Claims

ABSTRACT OF THE DISCLOSURE

Novel esters of crysanthemumic acid are disclosed. The compounds are useful as plant growth regulators.

SUMMARY OF THE INVENTION

This is a division of application Ser. No. 25,296 filed Apr. 2, 1970, now U.S. Pat. 3,701,799.

This invention relates to novel compositions of matter and their use as plant growth regulators. More particularly, this invention relates to compounds having the formula:

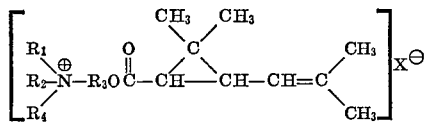

wherein $R_1$, $R_2$, and $R_4$ are selected independently from the group consisting of alkyl containing 1 through 6 carbon atoms, cycloalkyl containing 4 through 6 carbon atoms, alkenyl containing 2 through 6 carbon atoms, alkynyl containing 2 through 6 carbon atoms, benzyl, halobenzyl, phenyl and halophenyl; $R_3$ is alkylene containing 1 through 6 carbon atoms; and X is a member selected from the group consisting of chlorine, bromine, and iodine, and the use of these materials as plant regulators. Except as otherwise indicated, the terms "halogen" or "halo" used in describing the invention encompass chlorine, bromine, and iodine and include mono- and polysubstitution. In a preferred form, the invention relates to compounds having the formula:

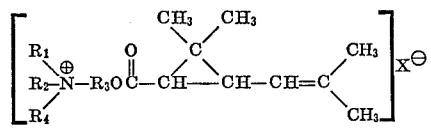

wherein $R_1$, $R_2$, and $R_4$ are selected independently from the group consisting of alkyl containing 1 through 6 carbon atoms, alkenyl containing 2 through 6 carbon atoms, benzyl, halobenzyl, phenyl and halophenyl; $R_3$ is alkylene containing 1 through 3 carbon atoms; and X is a member selected from the group consisting of chlorine, bromine, and iodine. In this embodiment, any halo-substitution is preferably mono- or di-halo. In its most preferred form, the invention relates to compounds having the formula:

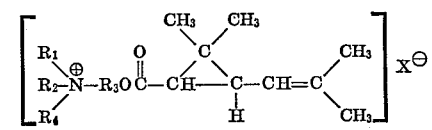

wherein $R_1$, $R_2$, and $R_4$ are selected independently from the group consisting of alkyl containing 1 through 3 carbon atoms, phenyl, and halophenyl containing not more than two halogen atoms; $R_3$ is alkylene containing 1 through 3 carbon atoms, and X is selected from the group consisting of chlorine, bromine, and iodine; and the use of these materials as plant growth regulators. The term "plant growth regulator" or variants thereof, and as employed throughout the specification and claims, is used to describe those materials which exhibit certain effects on the growth habits of plants, including, but not limited thereto, dwarfing or stunting, regulation of the onset of flowering and the number of flowers produced, regulation of amount of fruit set, defoliation, reduction or inhibition of lateral growth, and shortening of internodes. Plant growth regulators, for example, may be used as stunting agents on grasses, thus allowing extended periods between grass cutting, while maintaining favorable landscape conditions. On certain crop species, greater pod yield allows increased production.

Compounds of the invention wherein $R_1$, $R_2$, and $R_4$ are independently alkyl, cycloalkyl containing 4 through 6 carbon atoms, alkenyl, alkynyl, benzyl, and halobenzyl, and $R_3$ is alkylene containing 1 to 6 carbon atoms, as indicated, may be prepared by the following general reactions:

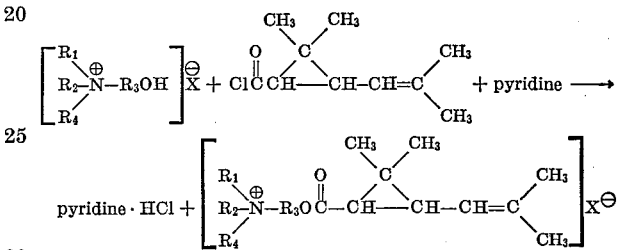

Compounds of the invention wherein $R_1$, $R_2$, and $R_3$ are independently phenyl or halophenyl are more suitably prepared by the following general reactions:

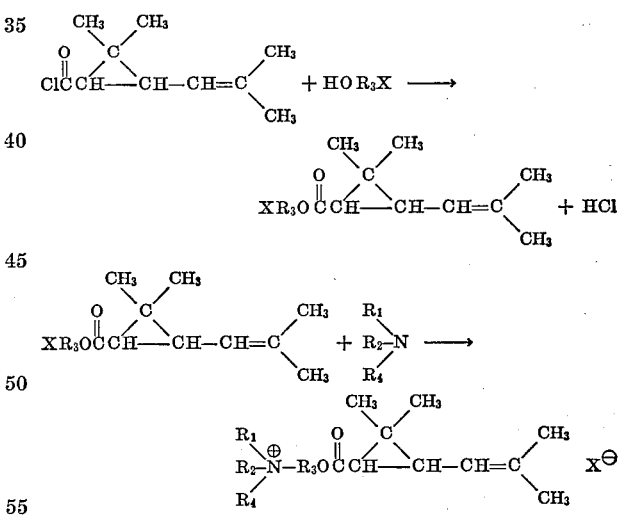

In the first described series in which $R_1$, $R_2$, and $R_4$ are non-aryl, the starting hydroxyamine salts, where not easily available, may be prepared by the following general reaction:

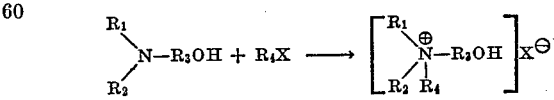

For example,

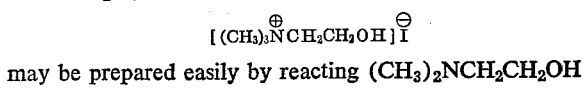

may be prepared easily by reacting $(CH_3)_2NCH_2CH_2OH$ with $CH_3I$.

The concentrations of the reactants employed are not particularly critical, although normally an excess of the pyridine will be employed. In general, approximately equimolar amounts may be employed. The reactions are generally carried out in a suitable inert solvent, such as benzene, acetone, dioxane, etc. Reactions of this type are exothermic, so that the addition of heat is not required and, in actuality, cooling may sometimes be necessary to control the reaction rate. The reactions will normally be carried out at temperatures of from about 15° C. to about 25° C. Pressures may be atmospheric, subatmospheric, or greater than atmospheric, as desired. Preparation of the compounds of the invention is illustated by the following examples:

EXAMPLE I

Preparation of 2-(N,N,N-trimethylamino)ethyl-chrysanthemumate chloride

Approximately 7.0 grams (0.05M) of choline chloride is suspended in 50 cc. of $CHCl_3$ and 7.2 grams (0.09M) of pyridine. About 11.4 grams (0.06M) of chrysanthemumic chloride is added while keeping the temperature below 20° C. The mixture is allowed to stand at room temperature for about 18 hours. The mixture is then heated to about 60° C., evaporated and the residue is taken up in 50 cc. of methanol. About 13.2 grams (0.06M) of 25 percent $NaOCH_3$ is added and the temperature is maintained below 20° C. for about 5 minutes. The mixture is then filtered and evaporated to give 2-trimethylamino-ethylchrysanthemumate chloride.

EXAMPLE II

Preparation of 3(N,N-diethyl, N-propylamino)propyl-chrysanthemumate chloride

The procedure of Example I is repeated, except that

is substituted for the choline chloride.

EXAMPLE III

Preparation of 2-(N,N-diethyl, N-α-allylamino)ethyl-chrysanthemumate chloride

The procedure of Example I is repeated, except that

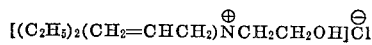

is substituted for the choline chloride.

EXAMPLE IV

Preparation of 2-(N,N-diethyl, N-ethynylamino)ethyl-chrysanthemumate chloride

The procedure of Example I is repeated, except that

is substituted for the choline chloride.

EXAMPLE V

Preparation of 2-(N,N,N-tributenylamino)ethyl-chrysanthemumate bromide

The procedure of Example I is repeated, except that

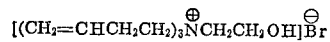

is substituted for the choline chloride.

EXAMPLE VI

Preparation of (N,N-dimethyl, N-benzyl amino)methyl-chrysanthemumate chloride

The procedure of Example I is repeated, except that

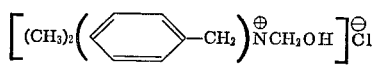

is substituted for the choline chloride.

EXAMPLE VII

Preparation of 2-(N,N-dimethyl, N-p-chlorobenzylamino)ethyl-chrysanthemumate chloride The procedure of Example I is repeated, except that

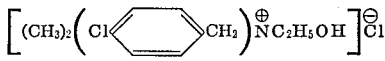

is substituted for the choline chloride.

EXAMPLE VIII

Preparation of 2-(N,N,N-triphenylamino)ethyl-chrysanthemumate iodide

About 10.3 grams of chrysanthemumic chloride, 12 grams of ethylene Iodohydrin, and 25 cc. of benzene are combined and allowed to stand for approximately 48 hours. The mixture is then evaporated, taken up in benzene, washed with $H_2O$, aqueous $NaHCO_3$, dried with $MgSO_4$, and again evaporated to produce

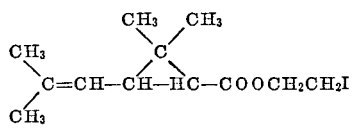

About 17.4 grams (0.054M) of this product is mixed with 75 cc. of acetone, cooled to −30° C., and 13.2 grams (0.054M) of triphenylamine at −5° C. are added. The mixture is allowed to come to room temperature and stand for about 48 hours. The mixture is then evaporated, slurried in ether, filtered, and dried in a desiccator to produce 2-(N,N,N - triphenylamino)ethyl-chrysanthemumate Iodide.

EXAMPLE IX

Preparation of 2-(N,N,N-tri-p-chlorophenylamino)ethyl-chrysanthemumate Iodide

The procedure of Example VIII is repeated, except that (p-chlorophenyl)$_3$N is substituted for the triphenylamine.

Compounds which may be produced accordng to the invention include:

2-(N,N,N-trimethylamino)ethyl-chrysanthemumate chloride
2 - (N,N,N - trimethylamino)ethyl - chrysanthemumate iodide
2 - (N,N,N - trimethylamino)ethyl - chrysanthemumate bromide
3 - (N,N,N - triethylamino)propyl - chrysanthemumate chloride
3-(N,N-dihexyl, N - methyl amino)propyl - chrysanthemumate bromide
3 - (N,N,N - triphenylamino)propyl - chrysanthemumate bromide
2 - (N,N-diethyl, N - ethynylamino)ethyl - chrysanthemumate chloride
2 - (N - cyclopentyl, N,N-di-methylamino)ethyl - chrysanthemumate chloride
2 - (N - methyl,N-ethyl, N-butylamino)ethyl-chrysanthemumate chloride
3 - (N,N-diethyl,N - propylamino)propyl - chrysanthemumate chloride
4 - (N - cyclohexyl,N,N-dimethylamino)butyl - chrysanthemumate chloride
2 - (N,N,N - triphenylamino)ethyl - chrysanthemumate bromide
2 - (N,N,N - triphenylamino)ethyl - chrysanthemumate chloride
2-(N,N-diethyl,N - allylaminoethyl - chrysanthemumate chloride
(N,N-dimethyl,N - benzylamino)methyl - chrysanthemumate chloride
(N-ethyl, N,N-dibenzylamino)methyl-chrysanthemumate chloride 2 - (N,N,N - tribenzylamino)ethyl - chrysanthemumate chloride 2 - (N,N-dimethyl,N-p-chlorobenzylamino)ethyl - chrysanthemumate iodide 2 - (N,N,N-p-tri-chlorophenylamino)ethyl - chrysanthemumate iodide 2 - (N,N,N-p-tri-chlorophenylamino)ethyl - chrysanthemumate chloride 2 - (N,N,N-p-tri-bromophenylamino)ethyl - chrysanthemumate bromide In order to demonstrate utility, the compound 2-(N,N,N-trimethylamino)ethyl-chrysanthemumate chloride was tested for plant growth regulatory activity as exemplary of the compounds of the invention, in the following series of tests.

EXAMPLE X

Metal flats were filled with loamy sand soil and sown with seeds of the crops, both grasses and broad leaf, indicated below in the table. The test compound was applied at a rate of about five (5) pounds per acre, ten days after sowing. The compound was applied by mixing 750 ml. of the test compound in 100 milliliters of a 50/50 water, acetone solution containing 1% Tween 20 (polyoxyethylene sorbitan monolaurate). Ratings were taken approximately three weeks after application of the test compound by comparing growth of the treated plant foliage with untreated controls. The results are shown in the table below:

TABLE I

Type of Regulation and Extent

| Species | Stunting, percent |
|---|---|
| Corn (*Zea mays* L.) | 20 |
| Milo | 40 |
| Cotton (*Gossypium hirsutum* L.) | 20 |
| Peas (*Pisum sativum*) | 40 |
| Sunflower (*Helianthus annuus* L.) | 90 |
| Cabbage (*Brassica oleracea* var. *Capitata*) | 20 |

EXAMPLE XI

The procedure employed in this example was similar to that of Example X, except that the test compound was applied at a rate of about two (2) pounds per acre to soybeans (first trifoliate stage) and cucumbers (third leaf stage). The results, recorded three (3) weeks after application, are shown in the table below:

TABLE II

| Species: | Growth Effects |
|---|---|
| Soybeans (*Grycine Max*) | Stunting; apical dominance broken; large percent of chlorophyll as compared with control at 6 weeks; plants had large increase of pods as compared with control. |
| Cucumbers (*Cucumis sativus*) | Earlier blossoming as compared with control; stunting. |

As may be seen by the test results, the compounds of the invention are useful in regulating the growth habits of plants. Preferably, the compounds are applied directly to the plants to be modified, although they may also be applied to a locus before emergence of the species to be regulated. It is necessary, of course, that the plants or locus receive an effective or regulating amount, i.e., an amount sufficient to give the desired plant growth regulating effect. Since the amount of active agent required will vary to some extent, depending on the plant treated, precise limits on the amounts employed cannot be given. The tests set forth above indicate exemplary amounts which may be used, as will readily be appreciated by those of skill in the art. Determination of the optimum effective concentration for a specific application is readily conducted by routine procedures, as will also be apparent to those skilled in the art.

The compounds are normally employed with a suitable carrier and may be applied as a dust, spray, drench, or aerosol. The compounds thus may be applied in combination with solvents, diluents, various surface active agents (for example detergents, soaps, or other emulsifying or wetting agents, surface active clays) carrier media, adhesives, spreading agents, humectants and the like. They may also be combined with other biologically active compositions, including fungicides, bactericides, and algaecides, insecticides, etc., as well as with fertilizers, soil modifiers, etc. The compounds of the invention may be used in combination with an inert carrier and a surface active or emulsifying agent, and may also be applied in combination with other biologically active materials, in conjunction with a carrier and a surface active or emulsifying agent. The solid and liquid formulations can be prepared by any of the conventional methods well-known by those skilled in the art.

Various changes and modifications may be made without departing from the spirit and the scope of the invention described herein, as will be apparent to those skilled in the art to which it pertains.

I claim:

1. A plant growth regulatory composition comprising an effective amount of 2 - (N,N,N - Trimethylamino) ethyl-chrysanthemumate chloride and an inert carrier.

2. A plant growth stunting composition comprising an effective amount of 2-(N,N,N-trimethylamino) ethyl-chrysanthemumate chloride and an inert carrier.

3. A method of stunting the growth of plants comprising applying to the plants an effective amount of 2-(N,N,N-trimethylamino) ethyl-chrysanthemumate chloride.

4. A method of regulating the growth habit of plants comprising applying to the plants an effective amount of 2-(N,N,N-trimethylamino) ethyl chrysanthemumate chloride.

5. A method of regulating the growth habit of plants comprising applying to the plants an effectve amount of a compound having the formula

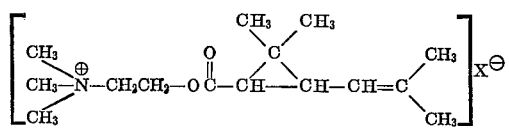

wherein X is a member selected from the group consisting of chlorine, bromine, and iodine.

6. A method of regulating the growth habit of plants comprising applying to a locus to be regulated an effective amount of 2-(n,n,n-trimethyamino) ethyl chrysanthemumate chloride.

7. A method of regulating the growth habit of plants comprising applying to a locus to be regulated an effective amount of a compound having the Formula

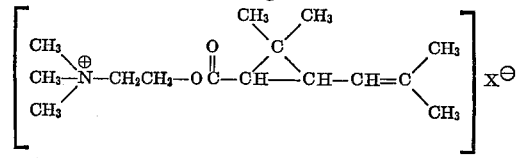

wherein x is member selected from the group consisting of Chlorine, bromine and iodine.

References Cited

UNITED STATES PATENTS

| 3,395,009 | 7/1968 | Oeltel et al. | 71—76 |
| 3,156,555 | 11/1964 | Tolbert | 71—67 |
| 3,156,554 | 11/1964 | Tolbert | 71—67 |
| 3,440,245 | 4/1969 | Kato et al. | 260—281 |

LEWIS GOTTS, Primary Examiner

C. L. MILLS, Assistant Examiner

U.S. Cl. X.R.

71—70, 106